Patented Mar. 10, 1931

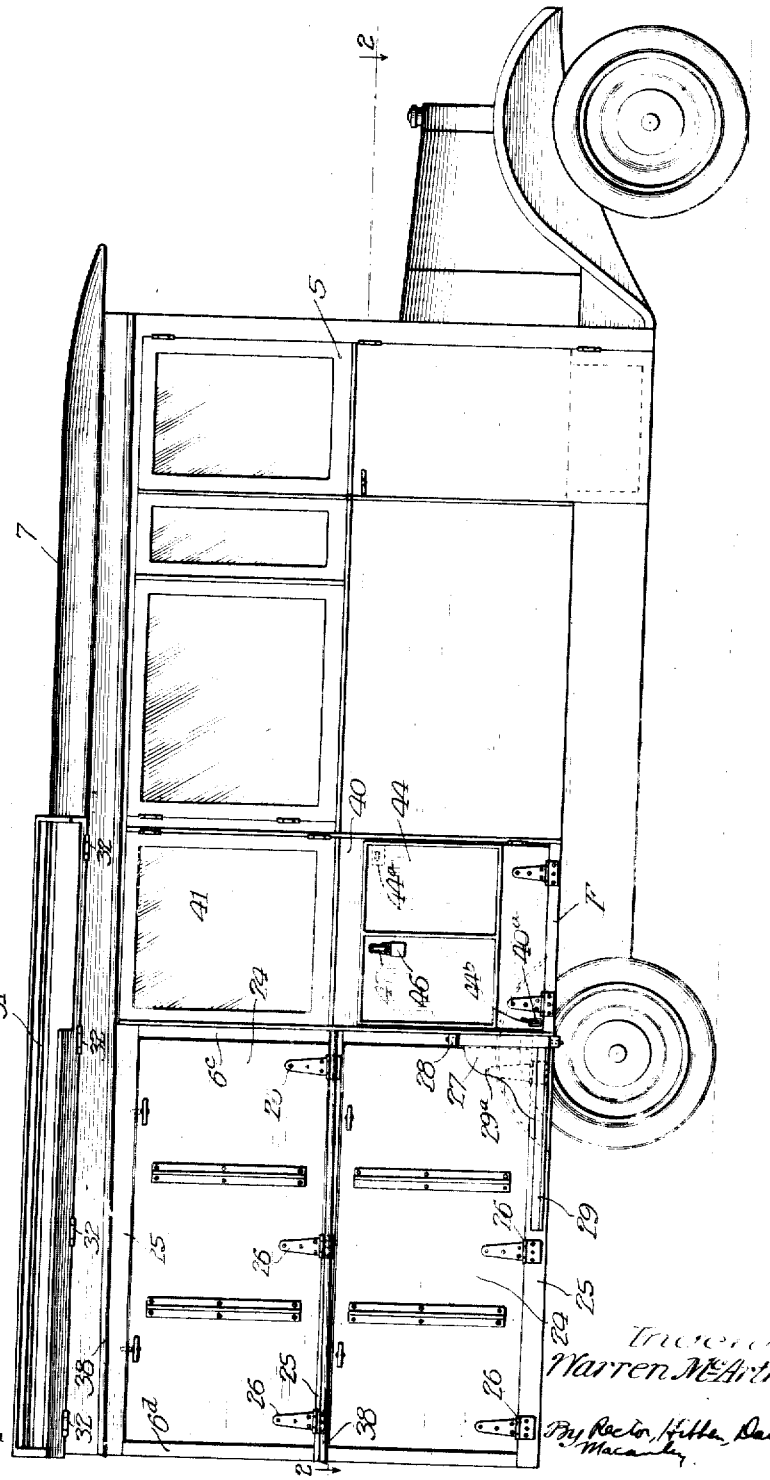

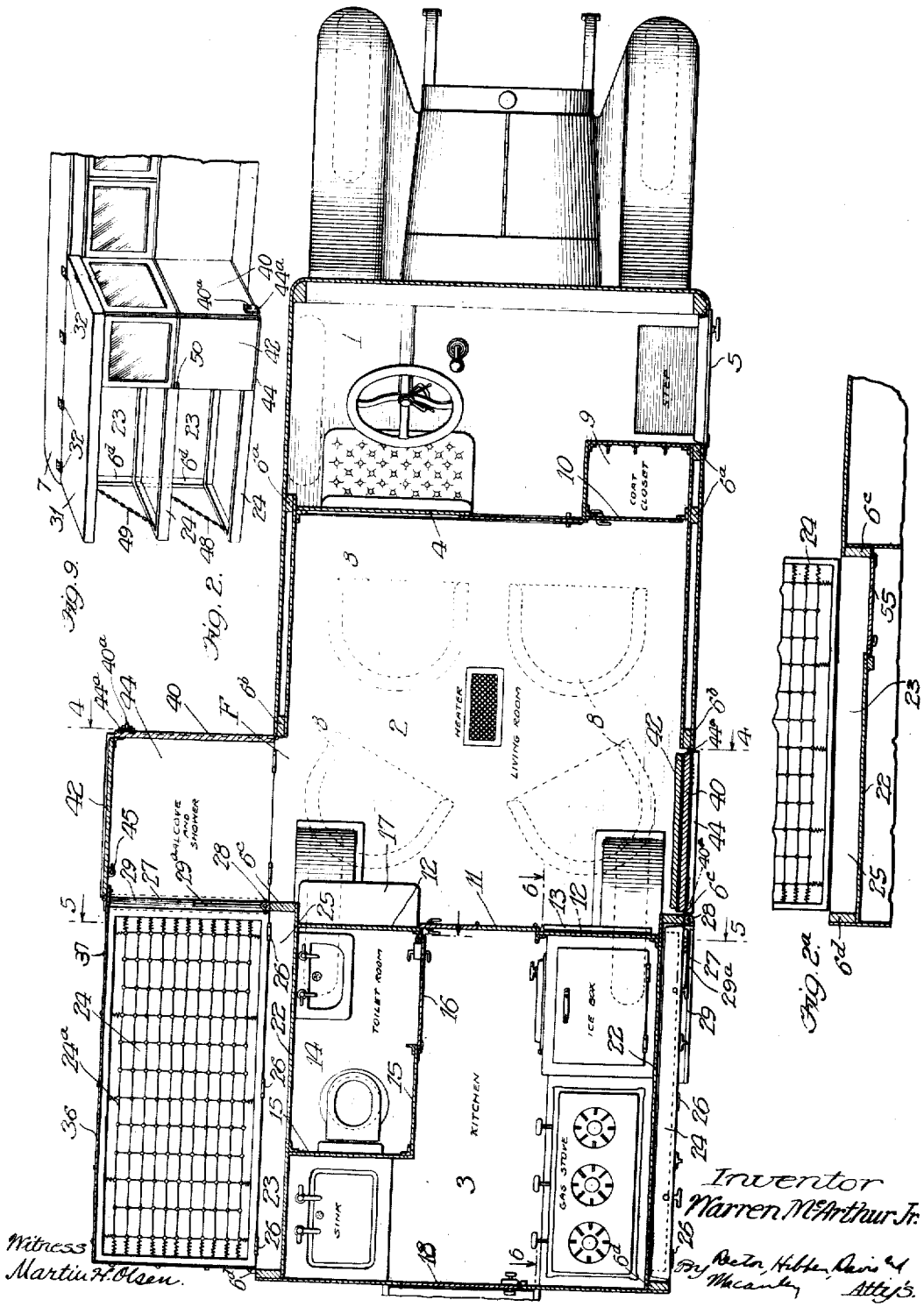

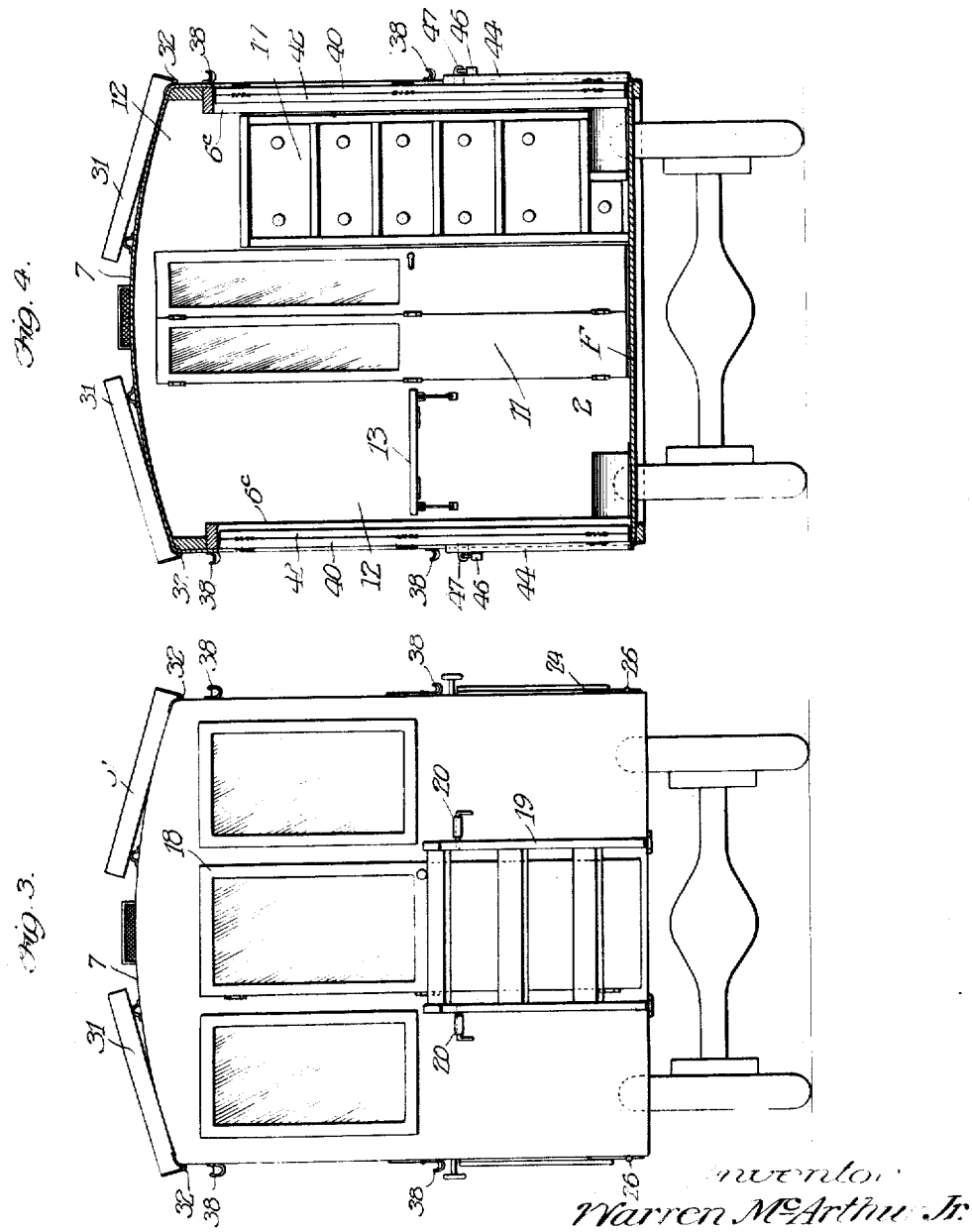

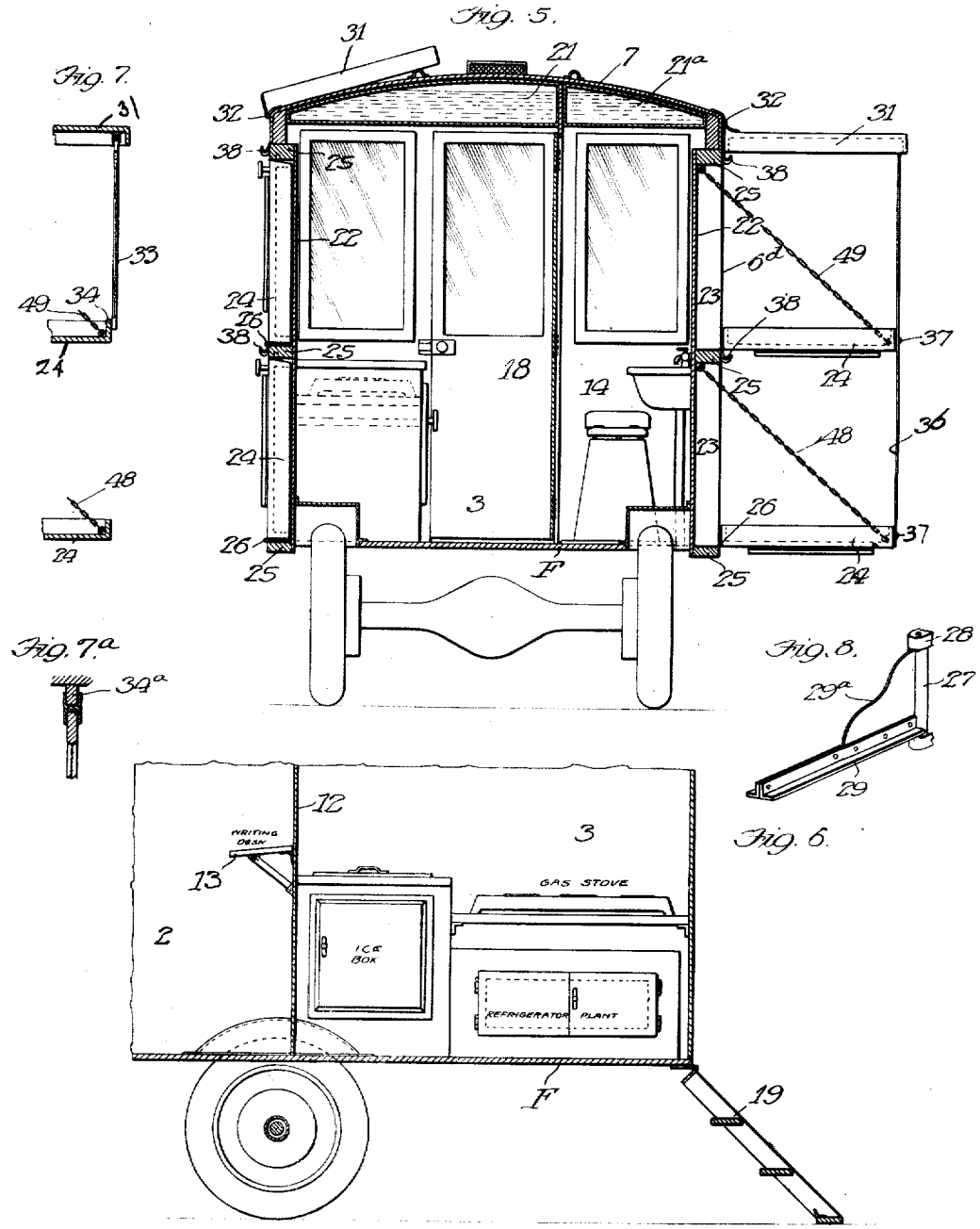

1,796,112

UNITED STATES PATENT OFFICE

WARREN McARTHUR, JR., OF PHOENIX, ARIZONA, ASSIGNOR TO McARTHUR BROTHERS MERCANTILE CO., OF PHOENIX, ARIZONA, A CORPORATION OF ARIZONA

TOURING AND CAMPING ROAD VEHICLE

Application filed January 4, 1926. Serial No. 79,064.

This invention relates to road vehicles and the like and more particularly to automobile bodies equipped with housekeeping accommodations and facilities, and traveling conveniences.

The principal object of the invention is to provide a touring automobile which is simple in construction and efficacious in use as a habitable camping vehicle, and is provided with living and sleeping quarters and cooking facilities.

One of the primary objects of my invention is to provide beds or berths which are foldable into the walls of the vehicle and which may be partitioned from the interior of the vehicle to give the desired privacy to the occupants and yet be readily accessible from the interior of the vehicle without the necessity of dismounting from the vehicle. To this end I employ a folding door and a movable platform adapted to be extended when the berths are opened in order to form an alcove or compartment adjacent to and in communication with the berths.

Another object of my invention is to provide rigid swinging tops or protecting canopies for the berths, which may be swung backwardly and supported by the top or roof of the vehicle when not in use.

Still another object of the invention is to provide a common bracket for supporting the movable platform and one of the berths in extended positions.

With the above and incidental objects in view, my invention consists in certain novel features of construction and combination of parts, the essential elements whereof are recited in the appended claims and a preferred form of embodiment of which is described in detail hereinafter and illustrated in full in the accompanying drawings, which form part of this specification.

In said drawings, Figure 1 is a side elevation of the motor vehicle embodying my invention; Fig. 2 is a horizontal section taken through the vehicle body as on the line 2—2 of Fig. 1; Fig. 2ª is a fragmentary horizontal section showing a modification of the means of access to the berths; Fig. 3 is a rear elevation of the vehicle; Fig. 4 is a transverse vertical section through the vehicle, looking towards the rear and taken at the position indicated by line 4—4 of Fig. 2, the berths being shown closed; Fig. 5 is a transverse vertical section through the vehicle, looking towards the rear and taken on the line of 5—5 of Fig. 2, the berths on one side being shown in lowered extended position and ready for use; Fig. 6 is a longitudinal section taken through the rear part of the vehicle as on the line 6—6 of Fig. 2; Fig. 7 is a fragmentary section through the side portions of the berth frames and canopy on one side to illustrate the means for supporting the canopies and the screens around the upper berths; Fig. 7ª is an enlarged fragmentary section illustrating one means of securing the upper edges of the screens in place; Fig. 8 is a perspective view of one of the brackets for supporting the lower berths in opened condition; and Fig. 9 is a perspective view of a rear portion of the vehicle, the berths being shown in their lowered extended position.

Referring to Figs. 1 and 2, it will be noted that the vehicle body is divided transversely into three main compartments including the driver's compartment 1, the living room 2 and the kitchen 3. The driver's compartment is separated from the living room by the partition 4 and access is had to the driver's compartment through the front door 5 on the right hand side of the vehicle. The vehicle body itself comprises a floor F, a skeleton frame having suitable vertical posts 6ª, 6ᵇ, 6ᶜ and 6ᵈ on each side to which the metal enclosing sheathing or paneling is secured, and a top 7 supported on the skeleton frame. I prefer to equip the living room with comfortable chairs 8, shown in dotted lines in Fig. 2, which may be shifted about as desired to suit the convenience of the passengers. A clothes closet 9 is formed in one corner of the driver's compartment and access is had thereto from the living room through a door 10 in the partition 4. A door 11, which is preferably formed in two sections and foldable on the central vertical line is adapted to close the doorway in the partition 12 forming the rear wall of the living room. On the left hand side of the door 11 I preferably provide a writing table 13 which may be folded against the partition 12 when not in use. To the right of the door 11 and against the partition 12, I may locate a tier of drawers 17 which may be used for storing wearing apparel or other articles.

The toilet room 14 is separated from the kitchen by walls 15 and access may be had thereto through a door 16. The kitchen is preferably provided with a stove, an ice box, a refrigerator plant, and a sink, as best illustrated in Figs. 2 and 6. A water supply tank 21 (Fig. 5) which is fitted against the underside of the roof over the kitchen supplies water to the faucets at the sink in the kitchen and a tank 21ª over the toilet room may be employed to supply water to the faucets at the wash bowl in the toilet room and to flush the closet, if desired.

The rear wall of the body is provided with a door 18 (Figs. 2, 3 and 6) and the doorway serves as the means of ingress and egress for the passengers. As shown in Figs. 3 and 6, I pivot steps or stairs 19 to the rear end of the floor of the body so that when the stairs are in the lowered position shown in Fig. 6 the passengers may pass to and from the kitchen. When the vehicle is in motion the stairs are swung up against the back of the vehicle and are latched in such position by latches 20 (Fig. 3) which may be of any desired form.

As shown in Figs. 2 and 5, the corner posts 6ᶜ and 6ᵈ which are at the rear corners of the vehicle and adjacent the rear corners of the dining room respectively, are quite wide and connecting bars 25 of the skeleton frame of the body are positioned between these posts. The side sheathings or panels 22 of the rear part of the vehicle body are secured to the inner edges of these posts and bars, thus affording the compartments 23 within the sides of the vehicle which are adapted to accommodate the berths 24 when they are folded against the body and not in use. The berths on the left-hand side of the body, as viewed in Fig. 5, are shown in such condition and the two berths on the other side of the vehicle are shown lowered for use. The upper and lower berths are pivoted by means of hinges 26 to the lower and intermediate cross bars 25 and when they are to be used may be swung outward and downwardly into horizontal position.

As shown in Fig. 2, each berth is provided with bed springs or a spring fabric structure 24ª. There is a swinging top or canopy 31 on each side of the vehicle adapted to cover the corresponding upper berth when swung to extended position, as illustrated by the position of the right-hand canopy in Fig. 5. The canopies, which are preferably tray-like in form, are hinged by hinges 32 to the top of the vehicle. In order to aid in supporting the canopies 31 in extended position and also protect the occupants of the berths from insects and the like I preferably employ screens 33 which are easily removable, being provided with inverted hooks 34 at their lower edges adapted to engage over the vertical flange of the berth frame and provided at their upper edges with grooves fitting over strips 34ª on the inside of the canopy as shown in Fig. 7ª. If desired like screens may be employed between the upper and lower berths. Also, if desired, legs adapted to fold up within the berths when they are closed may be used to support or additionally support the canopies 31. When the berths are opened they may be enclosed at the rear end and outer side by means of a curtain 36 which may be fastened to the outer edges of the berths by snap buttons 37 and to the inner sides of the depending flanges of the canopies 31 by similar, or other desired devices. I secure to the upper and intermediate cross-bars 25 inclined water troughs 38 to prevent rain or water from running down the sides of the vehicle and into the berths when the latter are in closed condition, the upper spouts also serving to prevent leakage of water into the upper berths when the berths are open.

In order to have ready access to the opened berths at each side without the necessity of leaving the vehicle and yet segregate the berths from the interior of the vehicle so that the occupants may have complete privacy I provide the following means which are preferably used on both sides of the vehicle: Pivoted at its forward edge to the post 6ᵇ is a door 40 (Figs. 1, 2 and 4) which when closed is adapted to close the door opening between the posts 6ᵇ and 6ᶜ. This door may be provided with a window 41 (Fig. 1), if desired. Pivoted to the rear edge of the door 40 is another door 42 which is adapted to lie up against the inner side of the door 40 when the doors are in closed condition, the doors then occupying the space between the posts 6ᵇ and 6ᶜ. The door 42 may also have a window or may be shorter than the door 40, so that the passengers may see through the window 41. Pivoted to the edge of the floor between posts 6ᵇ and 6ᶜ is a shelf or platform 44, which when the doors 40 and 42 are closed is in vertical position and rests flat against the lower portion of the door 40. It may be secured in this position by means of a lock 46 and a staple 47 secured to the door 40 and projecting through an opening in the platform 44. This platform is provided on its outer front edge with a hinged hasp 44ᵃ which, when the platform is folded and as shown in Fig. 2, is adapted to engage a staple 40ª carried by the door 40 and to be held in that position by a suitably provided pin passed through the staple. In this manner the front edge of the platform is supported by the door 40. A conveniently located slot 44ᵇ is provided to receive the staple 40ᵃ when the doors and platform are folded to permit the platform 44 to hinge back flush with the door 40.

To support the front end of the lower berths, as best shown in Figs. 1, 2 and 8, a swinging bracket 27 is pivoted on each side of the vehicle to the posts 6ᶜ, the brackets preferably having pintles extending through eyes 28 secured to the posts. The bracket is also provided with a projecting horizontal shelf 29 and a strengthening web 29ᵃ. When the berths are closed the brackets are swung out of the way against the sides of the vehicle. When the berths are to be made up on one side, the bracket on that side is swung outwardly and then the lower berth is opened to horizontal position in which condition its forward end rests on and is supported by the shelf 29. A chain 48, suitably attached to the intermediate cross bar 25 and to the outer portion of the berth as shown in Figs. 5 and 9, serves to support the rear end of the lower berth. The rear ends of the upper berths are supported by chains 49 suitably attached to the upper cross bars 25 and to the outer rear end of the berth. The front edges of the upper berths are provided with extending ledges which engage notches 50 in the door 42 whereby with the chains 49, the upper berths are held in place and supported in their extended position.

When the berths are to be made up the bracket 27 is swung outwardly, as above described. The platform 44 is then unlocked and lowered to horizontal position, being supported in such condition by the shelf 29 and hasp 44ᵃ. The web 29ᵃ of the bracket 27 is then between the adjacent edges of lower berth and platform. The door 40 is now swung outwardly at right angles to the vehicle body and the door 42 is swung rearwardly at right angles to the door 40 so that the doors 40 and 42 form two sides of a dressing or shower compartment or alcove with the platform 44 forming the floor thereof. The door is then swung to such a position relative to the vehicle body as to permit the upper berth to be swung down, after which the door 42 is moved back to engage the upper berth in the notch 50. Any device, such as an ordinary bolt 45, (Fig. 2) may be employed to secure the doors in extended condition. From the foregoing description, it will be evident that easy access may be had directly from the living room to the berths which are located along the sides of kitchen and that the occupants of the berths are assured of ample privacy. If desired, a curtain may be hung between the posts 6ᵇ and 6ᶜ on each side of the vehicle to separate the alcoves from the living room. It will be observed (Fig. 1) that the canopies 31 cover the alcoves when the canopies are extended and if desired the upper edges of the doors 40 and 42 may be connected to the flanges of the canopies, as by ordinary bolts, to secure the doors in extended condition. The doors 40 and 42 also aid in supporting the canopies 31.

It is obvious that when the berths are no longer to be used that the curtains and screens 33 are first removed, the berths are swung upwardly in closed condition within the compartments 23, the doors 42 and 40 are swung closed and then the platforms 44 are swung upwardly and secured in vertical position against the doors 40.

As shown in Fig. 2ᵃ, instead of employing the alcove on the left side of the vehicle for access to the berths I may use a door 55 in the partition or wall 22 between the toilet room and the berths for access to the latter. Obviously the ice box and stove may be arranged to permit a similar construction on the right side of the vehicle, if desired.

I do not intend to be confined to the exact structure shown and described, as it is obvious that it is susceptible of various modifications without departing from the spirit of my invention.

I claim:

1. In a vehicle body of the class described, the combination of a side wall, foldable berths mounted exteriorly on the side wall and adapted to collapse against the same when folded, and means including a side compartment at the end of said berths and a door leading therefrom to said berths for obtaining access to the unfolded berths directly from the interior of the body.

2. In a vehicle body of the class described, the combination of a side wall, a berth mounted on the body exteriorly of the side wall and adapted to be swung to vertical closed position or to horizontal position for use, and means including a separate compartment at the end of the berths and a door in said wall through which access may be had to the berth from the interior of said body.

3. In a vehicle body of the class described, the combination of a side wall, a berth mounted on the body exteriorly of the side wall, and extensible means for forming a compartment at one end of the berth for access thereto from the interior of the body.

4. In a vehicle body of the class described, the combination of a side wall, a berth mounted on the body exteriorly of the side wall, and extensible means comprising a movable platform and enclosing walls for forming a compartment at one end of the berth for ready access thereto from the interior of the body.

5. In a vehicle body of the class described, the combination of a side wall, a berth mounted on the body exteriorly of the side wall, and extensible means comprising a movable platform and folding doors for 6. In a vehicle body of the class described, the combination of a side wall having vertical doorway posts, a berth mounted on the body exteriorly of the side wall, a double folding door positioned between said posts when closed and forming two sides of a compartment adjacent one end of the berth when extended, and a movable platform adapted to form the floor of said compartment.

7. In a vehicle body of the class described, the combination of a side wall having vertical doorway posts, a berth mounted exteriorly on the side wall, a double folding door positioned between said posts when closed and forming two sides of a compartment adjacent one end of the berth when extended, and a platform hinged to the body and adapted to be lowered to form the floor of said compartment and to be secured in vertical position against said door when not in use.

8. In a vehicle body of the class described, the combination of a side wall section having compartments therein, berths mounted exteriorly on said side wall section and adapted to lie within said compartments when closed, and means comprising a movable platform and extensible doors for forming a compartment at one end of the berths.

9. In a vehicle body of the class described, the combination of a side wall section, a berth mounted on said section, means adapted to be extended to form a compartment at one end of the berth, and a canopy adapted to be extended to cover both the berth and the compartment.

10. In a vehicle body of the class described, the combination of a side wall section, a berth mounted on said section, means adapted to be extended to form a compartment at one end of the berth, and a rigid canopy hinged to the roof of the vehicle and adapted to be swung outwardly to cover both the berth and the compartment and to be swung inwardly against the outside of the roof when not in use.

11. In a vehicle body of the class described, the combination of a side wall, a berth mounted on the body exteriorly on said side wall, a double folding door for closing a doorway in said wall and adapted to be extended to form two sides of a compartment at one end of said berth, a movable platform adapted to form the floor of said compartment when extended, and a movable canopy adapted to be moved over said berth and compartment.

12. In a vehicle body of the class described, the combination of a side wall, a berth mounted on the body exteriorly on said side wall, a double folding door for closing a doorway in said wall and adapted to be extended to form two sides of a compartment at one end of said berth, a movable platform adapted to form the floor of said compartment when extended, and a rigid canopy hinged to the roof of said body and normally swung backwardly against the top of said roof and adapted to be swung outwardly and to be then supported by said doors in protecting position over said berth and compartment.

13. In a vehicle body of the class described, the combination of a side wall section, a berth mounted exteriorly on said section, a platform adapted to be moved to extended position to permit access to the berth, and a bracket secured to the body and adapted to be moved to extended position to support both the berth and platform.

14. In a vehicle body of the class described, the combination of a side wall, a berth mounted on the body exteriorly of the wall, a platform pivoted to the body and adapted to be lowered into horizontal position adjacent one end of the berth, a bracket pivoted to said body and adapted to be swung against said body or to be moved to extended position to support both the platform and berth in horizontal position.

15. In a vehicle body of the class described, the combination of a side wall section, a berth mounted exteriorly of the wall section, a platform pivoted to the body and adapted to be lowered into horizontal position adjacent one end of the berth, a bracket pivoted to said body and adapted to be swung against said body or to be moved to extended position to support both the platform and berth in horizontal position, the bracket having a web then positioned between the adjacent ends of the platform and berth.

16. In a vehicle body of the class described, vertically disposed side sheathings or panels forming an interior compartment, means for forming berth compartments on the outside wall surface of said panels on each side, said panels being so constructed that said interior compartment is not accessible through them from said berth compartments, and means separable at folding platform, one end of said berth compartments and communicating with the interior of the vehicle and also with said berth compartments permitting access to all said berth compartments without dismounting from the vehicle.

17. In a vehicle body of the class described, the combination of a roof, a rigid side wall section, a berth mounted on the side wall section and foldable therewith, means forming a separate compartment at the end of said berth, and a rigid cover hinged to the roof and adapted to be swung outwardly over the berth and said compartment to cover the latter and inwardly against the outside of the roof when not in use.

18. In a vehicle body of the class described, the combination of an exterior side wall section built up to form upper and lower exterior berth compartments partitioned from the interior of the vehicle body, means including a foldable platform and enclosure walls at the end of said compartment rendering said compartment accessible from the interior of the vehicle without dismounting from the vehicle, and upper and lower berths mounted exteriorly of the side wall section and foldable into said compartments, respectively, to close the same and to form an outer wall surface.

19. In a vehicle body of the class described, the combination of a side wall section comprising vertical and spaced horizontal frame pieces and a panel associated with said pieces forming separated exterior upper and lower berth compartments partitioned from the interior of the vehicle body, separate compartment forming means at one end of said compartments rendering said compartments accessible without dismounting from the vehicle, and berths carried by said horizontal frame pieces at the bottom of said compartments adapted to be folded to occupy said compartments with their bottoms forming parts of the exterior surface of the body.

In testimony whereof, I have subscribed my name.

WARREN McARTHUR, Jr.

ment to cover the latter and inwardly against the outside of the roof when not in use.

18. In a vehicle body of the class described, the combination of an exterior side wall section built up to form upper and lower exterior berth compartments partitioned from the interior of the vehicle body, means including a foldable platform and enclosure walls at the end of said compartment rendering said compartment accessible from the interior of the vehicle without dismounting from the vehicle, and upper and lower berths mounted exteriorly of the side wall section and foldable into said compartments, respectively, to close the same and to form an outer wall surface.

19. In a vehicle body of the class described, the combination of a side wall section comprising vertical and spaced horizontal frame pieces and a panel associated with said pieces forming separated exterior upper and lower berth compartments partitioned from the interior of the vehicle body, separate compartment forming means at one end of said compartments rendering said compartments accessible without dismounting from the vehicle, and berths carried by said horizontal frame pieces at the bottom of said compartments adapted to be folded to occupy said compartments with their bottoms forming parts of the exterior surface of the body.

In testimony whereof, I have subscribed my name.

WARREN McARTHUR, Jr.

CERTIFICATE OF CORRECTION.

Patent No. 1,796,112.      Granted March 10, 1931, to

WARREN McARTHUR, JR.

It is hereby certified that error appears in the printed specification of the above numbered patent requiring correction as follows: Page 4, line 16, claim 7, after the word "mounted" insert the words on the body, and line 17, for "on" read of; same page, lines 116 and 117, claim 16, for "and means separable at folding platform," read and separate foldable platform means at; and that the said Letters Patent should be read with these corrections therein that the same may conform to the record of the case in the Patent Office.

Signed and sealed this 21st day of April, A. D. 1931.

(Seal)                                  M. J. Moore,
Acting Commissioner of Patents.

CERTIFICATE OF CORRECTION.

Patent No. 1,796,112.                                        Granted March 10, 1931, to WARREN McARTHUR, JR.

It is hereby certified that error appears in the printed specification of the above numbered patent requiring correction as follows: Page 4, line 16, claim 7, after the word "mounted" insert the words on the body, and line 17, for "on" read of; same page, lines 116 and 117, claim 16, for "and means separable at folding platform," read and separate foldable platform means at; and that the said Letters Patent should be read with these corrections therein that the same may conform to the record of the case in the Patent Office.

Signed and sealed this 21st day of April, A. D. 1931.

(Seal)
M. J. Moore,
Acting Commissioner of Patents.